358-86. OR 2,697,746 SR

SEARCH ROOM

Dec. 21, 1954 R. C. KENNEDY 2,697,746

TELEVISION PROGRAM SIGNAL DISTRIBUTION SYSTEM

Filed May 24, 1951 6 Sheets-Sheet 1

INVENTOR
Ralph C. Kennedy
BY
Charles H. Brown
ATTORNEY

INVENTOR
Ralph C. Kennedy
BY
Charles H. Brown
ATTORNEY

TELEVISION PROGRAM SIGNAL DISTRIBUTION SYSTEM

Filed May 24, 1951 6 Sheets-Sheet 3

INVENTOR
Ralph C. Kennedy
BY
Charles H. Brown
ATTORNEY

TELEVISION PROGRAM SIGNAL DISTRIBUTION SYSTEM

Filed May 24, 1951 6 Sheets-Sheet 4

INVENTOR
Ralph C. Kennedy
BY
Charles H. Brown
ATTORNEY

INVENTOR
Ralph C. Kennedy
BY
Charles H. Brown
ATTORNEY

INVENTOR
Ralph C. Kennedy
BY
Charles H. Brown
ATTORNEY

United States Patent Office 2,697,746

Patented Dec. 21, 1954

2,697,746

TELEVISION PROGRAM SIGNAL DISTRIBUTION SYSTEM

Ralph C. Kennedy, Queens Village, N. Y., assignor to Radio Corporation of America, a corporation of Delaware Application May 24, 1951, Serial No. 227,993

10 Claims. (Cl. 178—5.8)

The invention relates to electric current distribution systems, and particularly pertains to such systems for selectively and simultaneously distributing audio and video frequency signal currents constituting television programs to a number of utilization devices.

The rapid advance of television broadcasting has created many problems. One important problem is that of switching and distributing television signals in monitoring programs at television stations and in distributing said signals to a large number of receivers in hotels, apartment houses and the like where limited antenna facilities are available. Television stations must serve producers, clients, executives and others so that they may sit in their offices and see on television screens regular studio programs, rehearsals in studios, programs being aired by other local stations, and the like. Hotels and apartment houses have the problem of providing television screens in rooms or apartments on which the program of any locally-received station may be viewed. It is the purpose of the invention to provide improved systems and apparatus for these and related distribution purposes.

The invention has many desirable characteristics and advantages. As regards the person who does the actual viewing, it will be found that with the invention a minimum of effort is required to produce a picture on the screen and provide sound in the speaker. In this regard, but one manual switching operation is required to select the desired video signal and its associated audio signal simultaneously. Further, with the invention, there is a minimum of crossstalk between audio channels, video channels, or audio and video channels. This is particularly important for the television station applications. Again, the frequency response of the system according to the invention provides high quality pictures as well as sound, and transients in the picture are kept to a minimum. The signal-to-noise ratio of the system is of an acceptable value commensurate with good engineering practice, and the distortion of the audio system and black level shift of the video system is kept to a minimum. Moreover, the system is sufficiently flexible to permit future expansion. This is true as regards both the expansion of the number of input signal sources as well as the expansion of the number of output utilization devices to be employed.

An object of the invention is to provide an improved television signal distribution system in unit form which may be expanded merely by adding additional distribution units.

Another object of the invention is to provide an improved television program distribution system adaptable for use in monitoring television programs in a television broadcasting studio or for installation in multiple-dwelling houses.

Another object of the invention is to provide an improved television signal distribution system having a novel circuit arrangement for combining, before distribution, the audio and video signals at the point where the signals are collected.

Another object of the invention is to provide an improved television signal distribution system having a novel circuit arrangement for separating the combined audio and video signal at the viewing or receiving location.

A further object of the invention is to provide an improved television signal distribution system having a minimum of crosstalk between channels and distortion of both audio and video signals while maintaining optimum signal-to-noise ratio.

The foregoing objects of the invention are attained by means of a cross-bar type distribution network conveying carrier frequency currents modulated by audio and video signals constituting television programs on a plurality of individual program distribution busses. Each of these busses is adapted to be connected selectively to a number of output busses and in the event that any one of the output busses is not connected to a useful load device, a dummy impedance element is substituted therefor in order that the balance of the network remain undisturbed. A novel signal separator circuit is employed at the terminal of said network to separate the audio and video signals. Thus, any number of television monitors or viewing systems may be connected to a single source of television program signals, the distribution system being arranged for expansion to accommodate practically any number of utilization devices.

The invention will be described in greater detail with reference to the accompanying drawing forming a part of the specification and in which.

Figure 1:
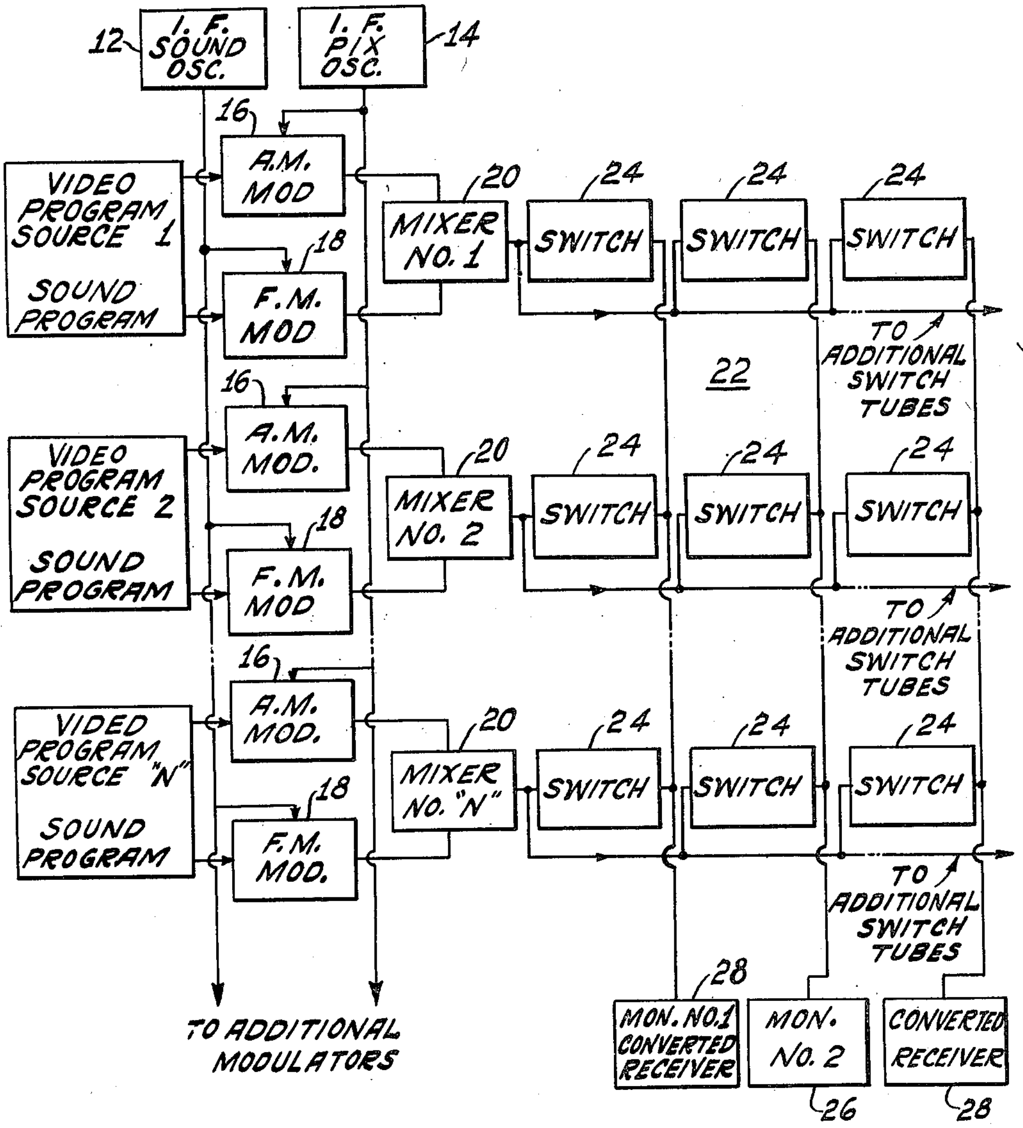
Fig. 1 is a functional diagram of a television signal distribution system according to the invention.

Referring to Fig. 1, there is shown an embodiment of the invention making use of I.-F. carriers for transmission. At the sending end there are two oscillators, 12, 14, one having a frequency which preferably is the same as the audio I.-F. amplifier channel of the standard television broadcast receiver and the frequency of the other oscillator is preferably the same as the video I.-F. signal of the same receiver. The use of accepted intermediate frequencies permits greater flexibility of construction at lower cost. The output circuits of oscillators 12, 14 are of low impedance in order to reduce interaction effects, including that between the subsequent modulators. Oscillator 14, whose frequency is that of the video signal, is used to drive all the video modulator tubes. Video signals which have been processed previously with horizontal synchronizing currents are amplitude modulated onto the video carrier by one of a plurality of video modulators 16 while the associated audio signal is frequency modulated onto the audio carrier by one of a plurality of audio modulators 18. Each different source of program is modulated onto the carriers by means of a separate pair of AM and FM modulators. After modulation, the two carriers are mixed in one of a plurality of mixers 20 and sent to a switching bay 22. In the event that it is desired to include those signals of the several television broadcasting stations in a community, e. g., in the case of hotels and apartment houses, single-channel fixed-tuned receivers are installed adjacent the optimum antenna location, one such receiver being used for each broadcasting station. The outputs of the audio and video I.-F. amplifiers are then fed by cable to associated mixers 20 where they may be fed to switches 24.

Switching consists of blocking or unblocking one of a plurality of amplifier tube circuits 24. The blocking action connects a particular program with the desired monitor 26 or converted receiver used as a monitor 28. Since the actual blocking action requires only a change of bias on the amplifier tube, a relay (not shown) with single-pole double-throw action may be employed to do the switching. Such relays may be actuated through a stepping relay and selector dial (not shown). Thus the first of the requirements outlined above is realized in that the actual viewer has only to dial a number the same as dialing a telephone in order to have a particular television program with its sound appear at his viewing position. It is desirable to have line amplifiers following switching bay 22 to produce the proper impedance match and level at the monitoring end. The monitors must be able to operate from the connecting cable. Where it is deemed desirable, conventional receivers may be used with the local oscillator disabled and the input applied directly to the grid of the converter tube of the receiver.

Since the intermediate frequency of television receivers is of the order of 25 megacycles, shielding may be used advantageously to reduce crosstalk. Converted conventional receivers would be very acceptable for hotel and monitoring use in regard to quality. With crosstalk at an acceptably low value, noise, that is, hum and the like, may be kept to proper limits by good engineering. The system may be expanded in the future by including additional modulators 16 and 18 and additional switching bays 22.

Figure 2:
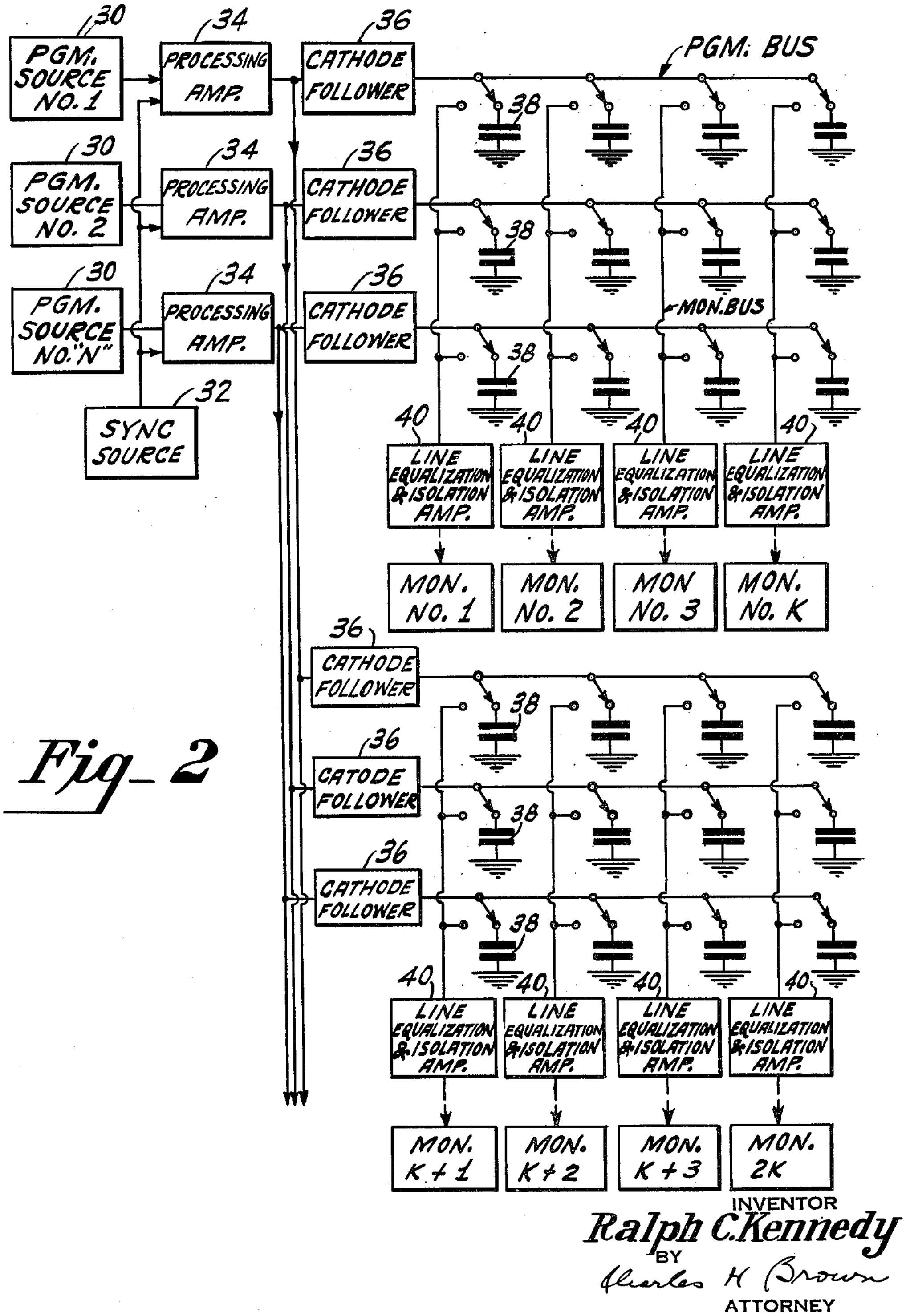
Fig. 2 is a functional diagram of an alternate embodiment of a television signal distribution system according to the invention.

Another system utilizing low impedance video busses for switching is shown in Fig. 2. This system likewise may use standard receivers which have been modified as monitors. Video signals corresponding to a television program are obtained from a plurality of sources 30 and are processed with synchronizing signals from a plurality of sources 32 in processing amplifiers 34. The output of amplifiers 34 are applied to cathode followers 36 which have low impedance cathode outputs. This low impedance bus is loaded with fixed capacity at each switching point in the form of capacitors 38. This capacity has the same magnitude as the grid input of line isolation amplifiers 40. Thus, the cathode follower load impedance is constant for any switching combination. After switching, the video signals are applied to the line isolation amplifiers 40. These amplifiers are connected to the cables going to the individual monitoring points. Each amplifier, preferably, is provided with a peaking control to permit amplitude equalization of each individual cable with its associated monitor input.

Audio signal distribution may be accomplished in several ways. One method requires a pair of wires to carry the audio to each monitoring point. The audio signals may be selected by means of stepping relays or Strowger switches depending on which type provides adequate contacts. The actual operation of switching the video signals in practice consists in actuating a single-pole double-throw relay for each program source. These relays may be operated through a stepping relay and dial selector. If the audio signal is to be switched by means of stepping relays, the latter may be placed in parallel with the stepping relays for video signal switching so that both video and audio signals are selected simultaneously.

When the system must include the distribution of signals from broadcasting stations, the video and sound outputs of the fixed-tuned single-channel receivers are fed into the processing amplifiers 34 and to the audio distribution system. The video signals from these receivers need not have synchronizing signals inserted by amplifiers 34 since they already contain them.

Figures 3, 8:
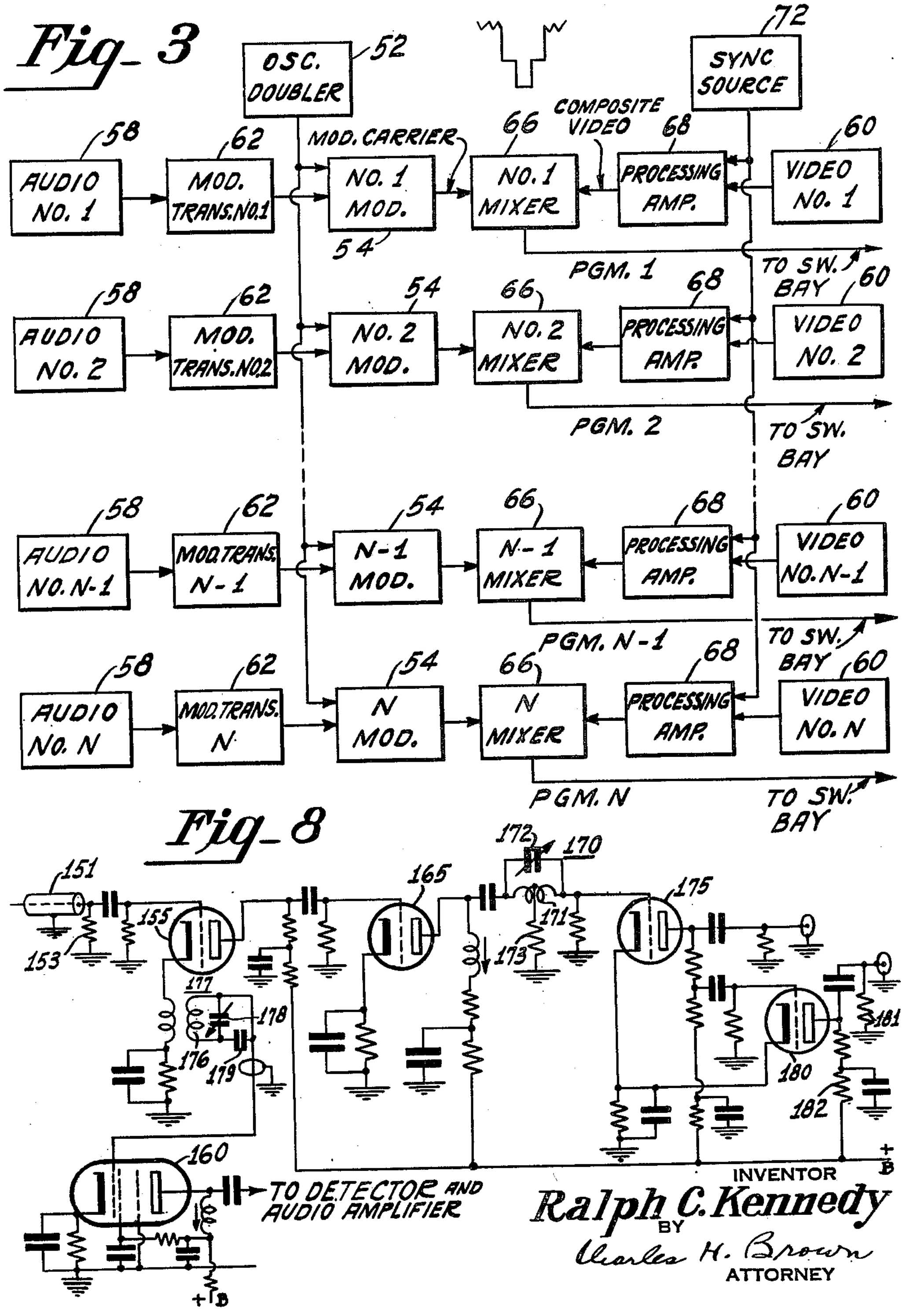
Figs. 3 and 4 are additional alternate embodiments of a television signal distribution system according to the invention.
Fig. 8 is a schematic diagram of the equipment for separating the video and audio signal components from the amplitude-modulated carrier at the receiving position.

A preferred method of switching the audio signals and making use of low impedance busses for switching is shown in Fig. 3. An oscillator or oscillator doubler 52 having an output slightly above the highest video frequency to be transmitted is coupled to the grids of tubes in a plurality of modulators in which the carrier wave is amplitude modulated by the various audio portions of television programs obtained from sources 58 corresponding to video signals obtained from sources 60 by way of transformers 62. These sound-modulated carriers are then applied to mixers 66. Video signals from sources 60 are applied to processing amplifier 68 where standard synchronizing pulses obtained from a source 72 are added and the resultant signal applied to the cathode followers for switching. By this means, the cable going to a particular viewing location carries on it not only video signals processed with synchronizing pulses but also the associated audio signals modulated onto a carrier whose frequency is just above the top of the video band. Furthermore, the stepping relays for switching audio signals outlined in the first method are eliminated since the relays which switch the video signals also switch the audio signals which now lie in the band of frequencies being transmitted through various channels.

Commercially available receivers, if used, are converted for the purpose by installing a sound-carrier-video separator at each viewing location. The video signal is first separated from the sound-modulated carrier. Sufficient gain should be incorporated to give about two volts of video signal to go into the first video amplifier stage in the converted receiver. After separation of the video signal, the sound-modulated carrier is amplified, detected, and the audio level brought up to a value sufficient to drive the first audio amplifier in the converted receiver.

As has been shown, dialing is all that is required for the switching operations. Crosstalk is minimized by having low impedance busses for switching. Preferably, the design is such as to allow a ten-megacycle bandwidth for the video signal components of the program. This will allow for future changes in standards as well as allow for sufficient bandwidth for color television when it is ready for commercialization. Since it has been found that the total capacity of all capacitors 38 across the cathode follower load resistance must be of the order of 750 $\mu\mu$fd., the magnitude of the cathode resistor must be no greater than 22 ohms. Even this will produce a gain of 0.707 times the midfrequency gain at ten megacycles.

Figure 4:
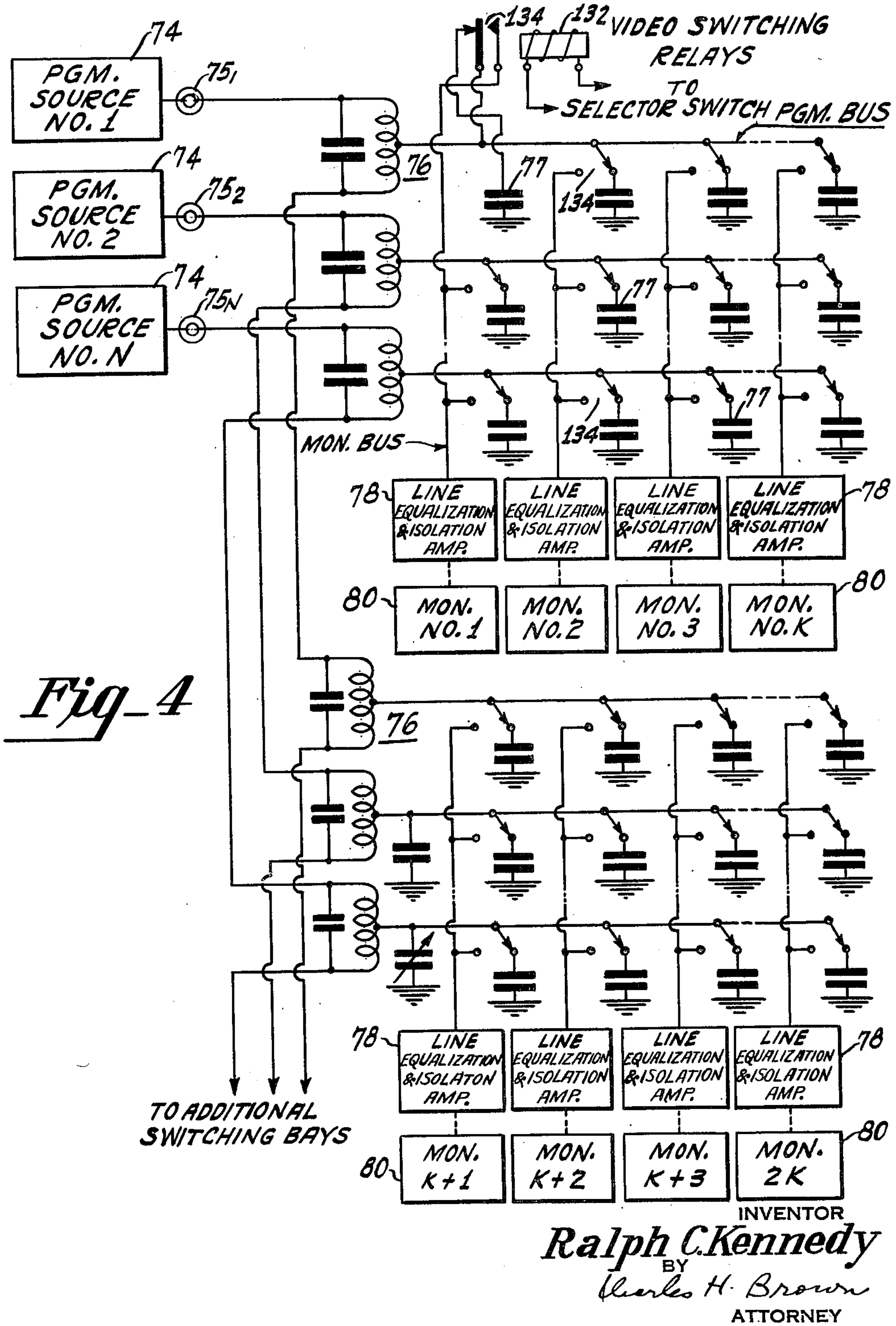

In the system of Fig. 4, bridged-T network to feed the program busses instead of cathode followers as outlined above are employed. The system of Fig. 4 makes use of many of the features described in the system of Fig. 3. The video is first processed with synchronizing currents. The audio frequency signal is modulated onto a carrier whose frequency is just above the top of the video band. The modulated carrier and the video frequency signal of each television program which has been combined with the synchronizing pulse train are mixed. These television program signals, shown in Fig. 4 as originating from sources 74, are applied to bridged-T networks 76. The shunt capacity of bridged-T networks 76 is divided equally between the switching points and is made equal to the grid input capacity of the isolation amplifiers 78. In this manner, each bridged-T network always has the correct value of capacity for its shunt regardless of the switching combination. These networks have been designed and built having a satisfactory response to ten megacycles. Further details of these bridged-T networks can be had by reference to U. S. Patent 2,315,784 issued April 6, 1943, and copending U. S. application Ser. No. 163,140 of E. D. Goodale, issued December 29, 1953, as U. S. Patent 2,664,546. After switching, the video and audio modulated carriers are applied to the line isolation amplifiers 78. The remainder of the system is the same as that described above in connection with Fig. 3. Thus, to recapitulate, this system retains all of the desirable features of the system described above in connection with Fig. 2, and eliminates the tubes required to drive the low impedance busses of that system.

The distribution system shown in Figs. 3 and 4 is equally applicable to monitoring programs originating in broadcasting studios or programs originating at other broadcasting stations and received over the air, or to distributing programs received over the air to a plurality of receiving positions, as for example in hotels, apartment houses or other multiple dwellings. In the latter case, preferably one receiver should be made available for each station to be received. The receivers preferably should be close to the associated antennas. Thus for tall buildings, the receivers would be located at or near the roof and the video and audio signals applied to the mixing unit. In this way, the receiver and its antenna may both be tuned and oriented to produce optimum performance on a single channel. Also, having the receivers located near the roof eliminates the need for long antenna leads with consequent loss of signal strength at the receiver antenna terminals with the addition of increased noise due to adjacent electrical disturbances, for example, that produced by elevators, air conditioning systems and the like.

Figure 5:
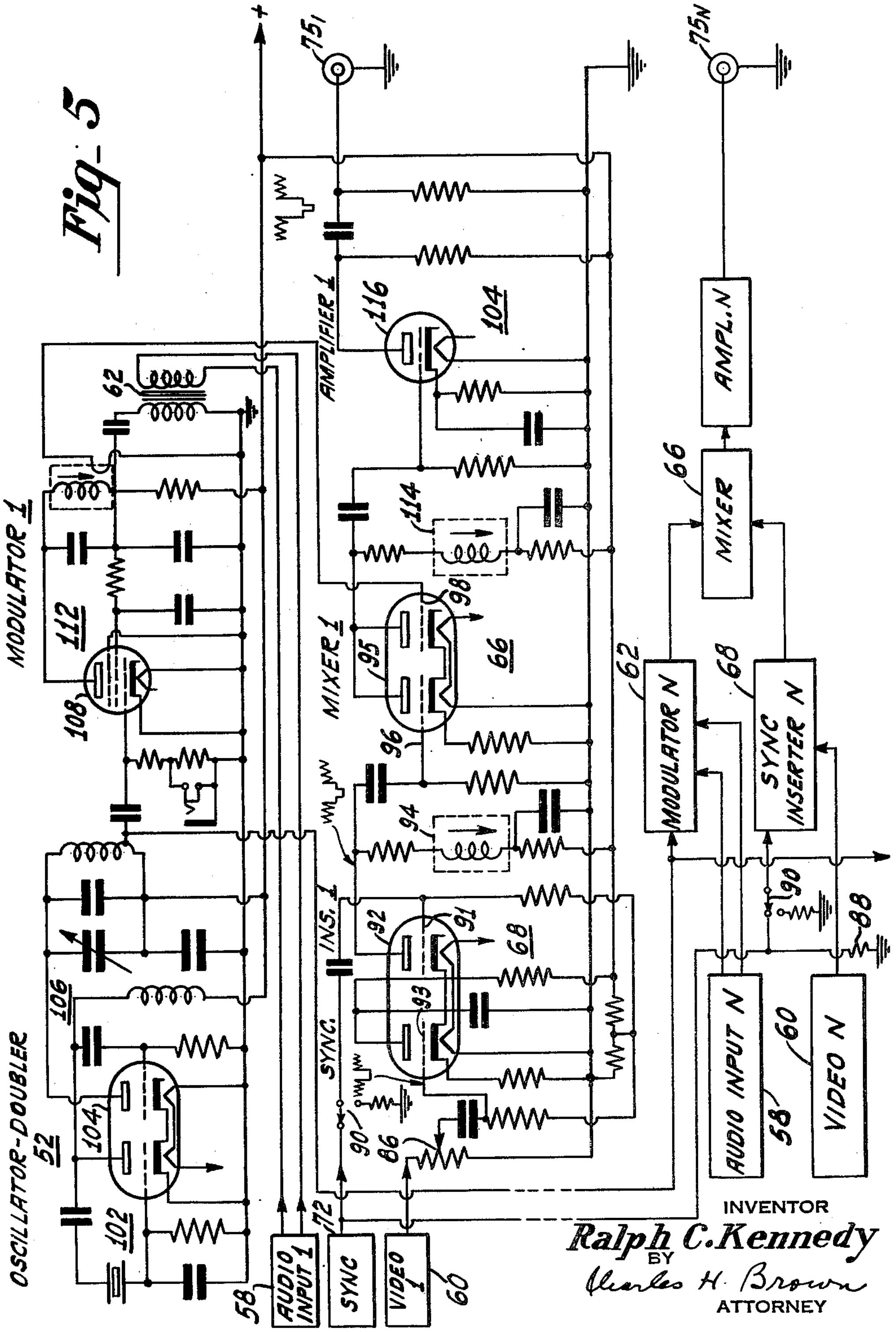
Fig. 5 is a schematic diagram of a component part of the arrangement illustrated in Fig. 3.

Referring to Fig. 5, there is shown a schematic diagram of one channel of an embodiment of the arrangement shown in Fig. 3. A sixteen channel installation may advantageously be built on a single chassis. Thus, there may be sixteen audio frequency signal input circuits 58, sixteen video frequency signal input circuits 60, one synchronizing voltage input circuit 72 (all shown in block form) and sixteen output circuits 75. The input video signal circuits are terminated in 75-ohm potentiometers 86 to permit adjustment of the video input level. The video signal is then applied to the grid of cathode-coupled triode amplifier 68. The synchronizing voltage input is terminated in a 75-ohm resistor 88. Single-pole double-throw switches 90 permit connecting the sync bus to the second grid 91 of any cathode-coupled triode 92. Thus, synchronizing voltage may be inserted if required. The value of synchronizing voltage is fixed and remains constant. The proper ratio of video signal to synchronizing voltage is adjusted by potentiometer 86 at each video signal input. An adjustable high frequency compensation circuit 94 is included in the anode circuit of tube 92. The output of tube 92 is applied to one grid 96 of a twin-grid mixer 66 which in practice comprises a dual triode tube. A crystal-controlled oscillator and doubler circuit 52 is preferably built into the mixing chassis. The crystal-controlled oscillator circuit 102 having a frequency of 5.235 mc./s. is connected to one section of dual triode tube 104 while the other section is a frequency doubler 106. The power output of the doubler should be about one watt at the frequency of 10.47 megacycles per second. This allows 470 kilocycles per second above the top of a ten-megacycle video band. The output of doubler 106 is low impedance and excites the grids of the sixteen anode-modulated amplifiers 112. It is considered desirable to keep the level of the modulated carrier considerably below the level of the video signal. This is prompted by the fact that regardless of the possible interaction between video and carrier which might occur, if the level of the carrier is far enough below the video, it would not be seen in the picture. With this in mind, the actual carrier voltages delivered to the modulated amplifier grids are preferably kept quite low. The percentage of modulation should be in the order of ten to twenty percent. Audio-frequency signals are applied directly to modulation transformers 62 without requiring additional modulator tubes. The coupling to the modulated amplifier tank is made very low since it is at this point that the modulated carrier is applied to grid 98 of mixer tube 66. The two anodes of the mixer 66 are interconnected and also include an adjustable high frequency compensation circuit 114. Mixer 66 output is applied to an output amplifier stage 104. The output of the amplifier is capacitively coupled to an output coaxial connector 75.

Figure 7:
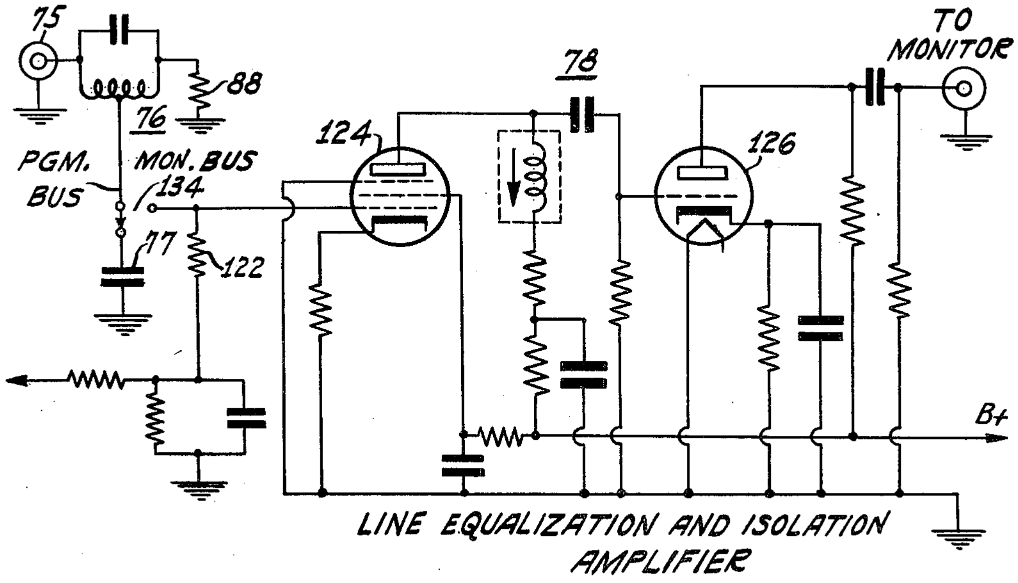
Fig. 7 is a schematic diagram of the equalization and isolation amplifiers of the arrangement shown in Figs. 3 and 4.

From terminal 75, each video program with its associated audio signal modulated onto a 10.47 mc. carrier is sent to the switching units as shown in general in Fig. 4 and in detail in Fig. 7. The number of units necessary is purely a function of the number of viewing positions to be supplied with programs.

Figure 6:
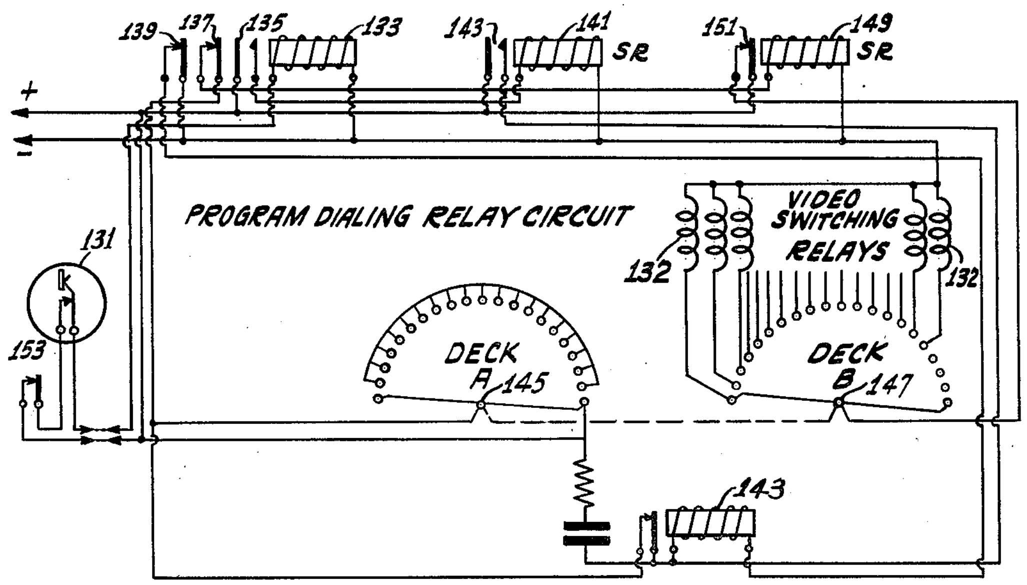
Fig. 6 is a circuit diagram of the relays required for each viewing position to select the desired program according to a preferred embodiment of the invention.

The programs, upon arrival from the processing-mixing unit, pass through bridged-T networks 76. These networks have an impedance of 72 ohms, thereby matching the cable. The slope of the phase characteristic of the networks is essentially constant with frequency to about 9 mc. The amplitude characteristic is essentially flat to about 11 mc. There is a capacity to ground at the center-tap of the coil. This capacity is divided into equal parts representative of the input capacity of the line equalization and isolation amplifiers. Preferably ten capacitors 77 of equal value are employed. Relays are used to switch the desired bridged-T onto a given monitor bus. Preferably, the switching relays are operated by stepping relays. There should be one stepping relay for each viewing position desired. Associated with each stepping relay are three other relays which provide pulsing, black-out and homing facilities as shown in Fig. 6, which is a circuit diagram of a preferred relay circuit used to convert each receiver or monitor to the distribution network. A standard telephone dial mechanism 131 is connected to energize a relay 133 to close contacts 135 and open contacts 137 and 139. When contacts 135 are closed, relay 141 is energized to close contact 143. This is the condition for the circuit ready to be used. Pulsing occurs by the open circuiting of the dial leads within the selector dial mechanism. This pulsing energizes relay 133 to operate in accordance with the dial pulses which also causes relay 143 to step contactors 145, 147 around to the desired position. This is caused by the operation of contacts 139 and due to the fact that relay 141 is a slow-to-release relay and thus does not follow the dial pulses. Once relay 133 stops operating and contacts 137 remain open, slow-to-release, relay 149 releases closing contacts 151 which energizes the selected one of switching relays 132. This applies signal voltages resulting in a picture on the monitor tube and sound in the speaker. Thus relay 149 prohibits the flashing of various pictures on the screen during the operation of switch 147. To "home" or return switch deck 147 to the starting position, a switch 153 adjacent dial 131 is open-circuited. Relay 133 falls back, causing contacts 139 to close, relay 141 to fall back and contacts 143 to open and contacts 137 to close the relay 149 to be energized, opening contacts 151. This removes the picture and simultaneously causes stepping motor 143 to home back to the first point on switch deck 145. Relays 132, used for switching a desired program to a desired monitor, need be only of the single-pole-double-throw variety but must have a very low capacity across contact springs 134, since the maximum permissible capacity to ground from any single bridged-T network must be exactly 500 $\mu\mu$fd. for ten mc./s. passband. This is made up of input capacity of the line equalization and isolation amplifiers, the capacity of the monitor busses, and the capacity of the relay contacts as well the capacity of the program bus connected to the bridged-T network. The amplitude response of the voltage taken across the shunt capacity is essentially flat to about 9 mc./s. with a drop of about ten percent at 10 mc./s. The energizing coils 132 are shown alone in Fig. 6 and the contacts 134 associated with coils 132 are shown alone in Fig. 4 save for one representative connection in the upper part of the figure.

As mentioned previously, the monitor busses are terminated by equalization and isolation amplifiers 78, shown in schematic form in Fig. 7. These amplifiers serve two purposes. They isolate the cable and monitor from the bridged-T network, and they have a high frequency compensation circuit included to permit equalization of high frequency cable loss. In order to eliminate cross talk into a channel which is not in use, the grids of the input tube of each amplifier are cut off when the amplifier is not in use. This is accomplished by placing a high bias on the grid of the tube. When the amplifier is switched onto a program bus, the voltage then appears across resistors 88 and 122 connected in series. Resistor 88 which is usually 75 ohms in practice is the termination for the cascaded bridged-T networks. Resistor 122 is the usual grid resistor and in practice is a megohm or so in value. Thus tube 124 is unbiased simultaneously with its connection to the program bus.

When it is necessary to add additional monitors or receivers, all that is required is to add additional switching bays cascading the successive bridged-T networks. When it is necessary to add additional program sources, it is necessary to add the bridged-T networks and relays for switching.

The output of line equalization and output amplifiers 78 is applied by way of cables to each viewing location. The equipment for cable termination, separation of amplitude-modulated carrier and video signal components, amplification of video signals to the level required, detection and amplification of audio signals to the level required to energize a loud speaker amplifier is shown in Fig. 8.

The complete video signal as well as the 10 mc./s. carrier upon which has been modulated the aural portion of the TV program is brought to the viewing position by way of cable 151. Thus it is necessary to first separate the video from the 10 mc./s. carrier and its modulation. This is accomplished in the circuit associated with tube 155. The cathode circuit of tube 155 includes a trap circuit 177 tuned to parallel resonance at the 10 mc./s. carrier frequency. Degeneration in the cathode circuit is greatly increased so that the effective gain of the tube is greatly reduced allowing practically no 10 mc./s. carrier with audio to appear at the output of tube 155. Simultaneously, due to the high Q of the cathode inductance-capacity circuit, considerable voltage at 10 mc./s. appears across tuned circuit 177, and is applied to the input circuit of tube 160.

Thus, the separation is realized and considerable resonance rise in voltage of the carrier occurs in this stage. Tube 165 is a video signal amplifier while the bridged-T notch filter 170 in the anode circuit of tube 165 is adjusted for a rejection frequency of the 10 mc./s. carrier which may remain in the video channel. Thus circuits 170 and 177 are tuned to the same frequency. Tubes 175 and 180 are merely video amplifiers. The outputs of these tubes are identical but 180° out of phase, so that the signal will have the proper amplitude and phase to feed into any monitor or into the first video stage of any receiver.

Tube 160 is simply an R-F amplifier for the 10 mc./s. carrier. After amplification, detection is effected in the detector circuits of the monitor or receiver after which sufficient audio amplification is provided to feed a speaker. If the receiver has an FM detector, it must be converted to perform amplitude detection, which is readily accomplished in known manner.

The separator circuit arrangement shown has been found to have the greatest rejection of video component than any arrangement of the prior art and at the same time is simple and inexpensive in construction and readily connected to television equipment in current use.

The following component values may be used for the oscillator-doubler, modulator, synchronizing inserter, mixer and separator circuits in a system according to the invention, designed for a carrier frequency of 10 mc./s. Other values may, of course, be used for different frequencies.

Tubes:

| Reference No. | Type |
|---|---|
| **92, 95, 104** | 6J6. |
| **108** | 6AU6. |
| **116** | 6J6 (parallel connected). |
| **155, 165** | 12AT7. |
| **160** | 6AU6. |
| **175, 180** | 6J6. |

Inductors:

| | |
|---|---|
| **94**, value | 2 μH. |
| **114**, value | 3 μH. |
| **171**, value | 1.3 μH. |
| **176**, value | 5 μH. |

Capacitors:

| | |
|---|---|
| **172** | 82 μμ (variable). |
| **178** | 25 μμ (variable). |
| **179** | 12 μμ. |

Resistors:

| | |
|---|---|
| **86** | 75 ohms. |
| **173** | 28 kilohms. |
| **153** | 75 ohms. |
| **181** | 100 kilohms. |
| **182** | 12 kilohms. |

The invention claimed is:

1. A complementary program signal distribution system for simultaneously distributing a plurality of complementary signals to a plurality of utilization apparatus including a modulator circuit, a carrier frequency oscillator connected to said modulator circuit, means to apply one of said program signals to said modulator circuit to modulate the carrier frequency wave, a program mixer circuit coupled to said modulator, means to apply another of said program signals to said mixer, a signal distribution network connected to said program mixer circuit, said network being terminated in its characteristic impedance and having a shunt reactance component, means selectively to connect utilization apparatus having a reactive component of the same nature as said reactance component to said network with the total shunt reactance component unchanged, and at least one utilization device having a single input circuit and two output circuits, one of said output circuits being connected to said input circuit by means of a notch filter arrangement and the other by means of a trap circuit arrangement to separate said complementary program signals for separate utilization.

2. A circuit arrangement for simultaneously distributing a plurality of electric waves constituting a program to a plurality of selectively operable program presentation devices, said program presentation devices having input circuits of given reactive nature, including a transmission line network terminated in its characteristic impedance and having a shunt reactance component of the said given nature, a switching arrangement in operative association with said network to couple said program presentation devices selectively thereto while maintaining said shunt reactance component substantially constant, a program mixer circuit connected to said transmission line network, means to apply at least one of said electric waves directly to said mixer circuit, means to generate at least one electric carrier wave, means to modulate said carrier wave by at least one of said plurality of electric waves, means to apply said modulated carrier wave to said mixer circuit, and at least one of said program presentation devices including means for separating each of said plurality of electric waves one from the other.

3. A television program signal distribution system including an audio modulator, a carrier frequency oscillator connected to said audio modulator, means to apply an audio program signal to said modulator to modulate the carrier frequency wave, a program mixer circuit coupled to said modulator, means to apply a video program signal to said mixer, a program signal distribution network connected to said program mixer circuit, said network being terminated in its characteristic impedance and having a shunt reactance component, means selectively to connect utilization apparatus having a reactive component of the same nature as said reactance component to said network with the total shunt reactance component unchanged, and at least one utilization device having a single input circuit and two output circuits, one of said output circuits being connected to said input circuit by means of a notch filter arrangement and the other by means of a trap circuit arrangement to separate the audio modulated carrier from the video program signals for application to individual program utilization apparatus.

4. A television signal distribution system including a plurality of program mixer stages one for each program to be distributed, a plurality of video mixer stages to which video program voltages, including synchronizing voltages, are applied connected individually to said program mixer stages, a plurality of modulator stages, means to apply a carrier frequency wave to each of said modulator stages, means to apply audio program voltages individually to said modulator stages to modulate the applied carrier wave, means to apply the modulated carrier waves to said program mixers, a cross-connecting program distribution switching arrangement connected to said program mixers, said arrangement having a shunt reactance component and means to switch utilization apparatus selectively into and out of circuit with the total shunt reactance maintained substantially constant, a plurality of utilization devices connected to said cross-connecting switching arrangement, said utilization devices having means for separating the audio modulated carrier wave from the corresponding video signals for further application.

5. In a television signal distribution system of the type wherein audio frequency signals are modulated on a carrier wave of frequency removed from the video frequency wave and the waves are simultaneously distributed, a signal separating circuit arrangement including a signal input circuit comprising an electron discharge device having a cathode, an anode and a grid, to which said modulated carrier and video frequency waves are applied, a trap circuit connected to the cathode of said electron discharge device tuned to parallel resonance at the frequency of said carrier wave, said input circuit being sufficiently degenerative to prevent substantially any energy of said modulated carrier wave from appearing at the anode of said electron discharge device, a modulated carrier frequency amplifier stage having the input circuit thereof coupled to said trap circuit, said trap circuit having a high figure of merit whereby considerable resonance rise in modulated carrier voltage is obtained, a video amplifier stage connected to the anode of said electron discharge device, and a rejection filter in circuit with said video amplifier stage tuned to resonance at the frequency of said carrier wave to reject any components thereof appearing in the video amplifier stage.

6. In a distribution system for simultaneous distribution of a plurality of electric waves, a circuit arrangement for separating two electric waves transmitted over a common transmission medium, including an electron discharge device having a cathode, anode and control grid, means coupling said control grid to said transmission medium, a parallel resonant circuit having a resonant frequency equal to the frequency of one of said waves coupled to said cathode an output circuit coupled to said parallel resonant circuit for delivering said one wave to corresponding utilization apparatus, an amplifier coupled to the anode of said electron discharge device, and a rejection filter connected in series circuit with said amplifier and tuned to series resonance at the frequency of said one wave to attenuate the same, and an output circuit coupled to said amplifier to deliver the other of said waves to corresponding utilization equipment.

7. A circuit arrangement for simultaneously distributing a plurality of electric waves constituting a number of programs to a plurality of selectively operable program presentation devices, said program presentation devices having input circuits of given reactive nature, including a transmission line network terminated in its characteristic impedance and having shunt reactance components of said given nature, a switching arrangement in operative association with said network to couple said program presentation devices selectively thereto while maintaining said shunt reactance components substantially constant, a plurality of program mixer circuits connected to said transmission line network, means to apply at least one of said electric waves constituting a program directly to each of said mixer circuits, means to generate at least one electric carrier wave, means to modulate said carrier wave by at least one of said plurality of electric waves constituting a program, means to apply said modulated carrier waves to the mixer circuits corresponding to the programs of said directly applied electric waves, and at least one of said program presentation devices including frequency selective means for separating each of said plurality of electric waves one from the other.

8. A television signal distribution system including a plurality of program mixer stages, one for each program to be distributed, a plurality of video mixer stages to which video program voltages are applied connected individually to said program mixer stages, means to apply synchronizing voltages to each of said video mixer stages, a plurality of modulator stages, means to apply a carrier frequency wave to each of said modulator stages, means to apply audio program voltages to said modulator stages individually to modulate the applied carrier wave, means to apply the modulated carrier waves to said program mixers, a cross-bar program distribution switching arrangement connected to said program mixers, said arrangement having a shunt reactance component and means to switch utilization apparatus having given shunt reactance values selectively into and out of the circuit with the total shunt reactance maintained substantially constant, a plurality of utilization devices connected to said cross-bar switching arrangement, said utilization devices having filter means for separating the audio modulated carrier wave from the corresponding video signals for further application.

9. In a television signal distribution system of the type wherein audio frequency signals are modulated on a carrier wave of frequency removed from the video frequency wave and the waves are simultaneously distributed, a signal separating circuit arrangement including a signal input circuit comprising an electron discharge device having a cathode, an anode and a grid, to which said modulated carrier and video frequency waves are applied, a resonant trap circuit connected to the cathode of said electron discharge device tuned to parallel resonance at the frequency of said carrier wave, said input circuit being sufficiently degenerative to prevent substantially any energy of said modulated carrier wave from appearing at the anode of said electron discharge device, a modulated carrier frequency amplifier stage having the input circuit thereof coupled to said resonant trap circuit, said resonant trap circuit having a high figure of merit whereby considerable resonance rise in modulated carrier voltage is obtained, a video amplifier stage connected to the anode of said electron discharge device, a bridged-T rejection filter in circuit with said video amplifier stage, said filter comprising a center-tapped inductor shunted by a variable capacitor and connected in series circuit with said amplifier stage, and a resistor connected to said center-tap and shunted across said amplifier stage, said filter being tuned to resonance at the frequency of said carrier wave to reject any components thereof appearing in the video amplifier stage.

10. In a distribution system for simultaneous distribution of a plurality of electric waves, a circuit arrangement for separating two electric waves transmitted over a common transmission medium, including an electron discharge device having a cathode, anode and control grid circuit coupled to said transmission medium, a circuit in the cathode circuit of said device tuned to parallel resonance at the frequency of one of said waves, an output circuit coupled to said tuned circuit for delivering said one wave to corresponding utilization apparatus, an electron discharge system coupled to the anode of said electron discharge device, a bridged-T notch filter connected in series circuit with said electron discharge system and tuned to series resonance at the frequency of said one wave to reject the same, an output circuit coupled to said electron discharge system to deliver the other of said waves to corresponding utilization equipment, a phase inverter coupled to said electron discharge system, and a further output circuit coupled to said phase inverter to deliver said other wave to said corresponding utilization equipment with a change in phase.

References Cited in the file of this patent

UNITED STATES PATENTS

| Number | Name | Date |
|---|---|---|
| 2,241,586 | Dorsman | May 13, 1941 |
| 2,570,475 | Oestreicher | Oct. 9, 1951 |